(12) United States Patent
Vallis et al.

(10) Patent No.: US 6,480,932 B1
(45) Date of Patent: Nov. 12, 2002

(54) COMPUTER SYSTEM HAVING A HOST COMPUTER COUPLED TO A DISK DRIVE WITH A DRIVE-SELECTED-APPLICATION PARTITION FOR STORING DATA FOR EXECUTION BY THE HOST COMPUTER IN RESPONSE TO DRIVE-DETERMINED CONDITIONS

(75) Inventors: Mark F. Vallis, Rancho Santa Margarita, CA (US); Vu V. Luu, Milpitas, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 163 days.

(21) Appl. No.: 09/773,941

(22) Filed: Jan. 31, 2001

(51) Int. Cl.[7] .............................................. G06F 12/00
(52) U.S. Cl. ........................ 711/112; 711/153; 711/173; 713/1; 713/2
(58) Field of Search ................................ 711/112, 153, 711/173; 713/1–2

(56) References Cited

U.S. PATENT DOCUMENTS 5,829,045 A * 10/1998 Motoyama .................. 711/162
6,138,179 A * 10/2000 Chrabaszcz et al. ........ 711/162
6,154,835 A * 11/2000 Charbaszcz et al. ........... 713/1
6,202,121 B1 * 3/2001 Walsh et al. .................. 710/10

\* cited by examiner

*Primary Examiner*—Do Hyun Yoo
*Assistant Examiner*—Mehdi Namazi
(74) *Attorney, Agent, or Firm*—Milad G. Shara, Esq.; Robroy R. Fawcett, Esq.

(57) ABSTRACT

A computer system has a host computer coupled to a disk drive having a host interface subsystem. The host interface subsystem includes a user partition, a drive management partition, and a disk-drive-selected application partition. The user partition stores data for execution by the host computer. The drive management partition stores data for execution by the disk drive. The disk-drive-selected application partition stores data for execution by the host computer in response to a drive-determined condition. The host interface subsystem further includes a user command interface that processes commands for storing data in the user partition, a first drive command interface that processes commands for storing data in the disk drive management partition according to a first disk-drive command protocol, and a second drive command interface that processes commands enabling data storage in the application partition according to a second disk-drive command protocol.

16 Claims, 3 Drawing Sheets

| DDSAP COMMANDS | |
|---|---|
| REGISTER | VALUE |
| FEATURES | 57h (key, ASCII "W") |
| SECTOR COUNT | 44h (key, ASCII "D") |
| SECTOR NUMBER | 43h (key, ASCII "C") |
| CYLINDER LOW | 03h = RETURN DDSAP START LBA<br>04h = RETURN DDSAP SIZE<br>07h = OPEN DDSAP<br>08h = CLOSE DDSAP<br>09h = SET APPLICATION INSTALLED FLAG |
| CYLINDER HIGH | 00h |
| COMMAND | 8Ah (VENDOR UNIQUE) |

FIG. 2

COMPUTER SYSTEM HAVING A HOST COMPUTER COUPLED TO A DISK DRIVE WITH A DRIVE-SELECTED-APPLICATION PARTITION FOR STORING DATA FOR EXECUTION BY THE HOST COMPUTER IN RESPONSE TO DRIVE-DETERMINED CONDITIONS

BACKGROUND OF THE INVENTION

1. Field of the Invention

The present invention relates to digital information storage, and more particularly, to a computer system having a disk drive with a hidden partition for storage of a disk-drive selected application.

2. Description of the Prior Art

Traditionally, a disk drive provides a nonvolatile disk media for storage of user and application information under exclusive control of a host computer. The host computer generally operates under the control of an operating system that may or may not be stored on the disk drive. During manufacture, the disk media is generally divided into a disk management partition and a general user partition. The disk management partition is accessed using commands commonly referred to as "native" commands and holds information related to the configuration of the disk drive and the physical format of the disk media. The information in the disk management partition generally remains unaltered after the disk drive is shipped from the manufacturer.

The general user partition must be partitioned into one or more logical drives and logically formatted before information is stored on the partition. The partitioning and formatting process generally destroys any existing information stored in the general user partition. The host computer stores information in and reads information from the user partition by issuing host commands, generally industry standard commands, that specify the location of the information being accessed.

The disk drive manufacturer may logically partition and pre-format the disk media and store information on the general user partition for later execution by the host computer before shipping the disk drive. However, the manufacturer's information may be deleted by an original equipment manufacturer (OEM) or by an end user, or destroyed during a subsequent partitioning and formatting process.

Accordingly, there exists a need for permitting a disk-drive manufacturer to store information, for later execution by a host computer, on the disk media that may not be deleted or destroyed during a subsequent logical partitioning and formatting process. The present invention satisfies this need.

SUMMARY OF THE INVENTION

The present invention may be embodied in a computer system, and related method, having a host computer coupled to a disk drive having a host interface subsystem for processing host commands received from the host computer. The host interface subsystem includes a user partition, a drive management partition, and a disk-drive-selected application partition. The user partition stores data for execution by the host computer and the drive management partition stores data for execution by the disk drive. The disk-drive-selected application partition stores data for execution by the host computer in response to a drive-determined condition. The host interface subsystem further includes a user command interface, and first and second drive management command interfaces. The user command interface processes first host commands directed to storing data in the user partition according to an industry standard interface protocol. The first drive management command interface processes second host commands directed to storing data in the disk drive management partition according to a first disk-drive command protocol. The second drive management command interface processes third host commands enabling data storage in the disk-drive-selected application partition according to a second disk-drive command protocol.

In more detailed features of the invention, the drive-determined condition may be based on an application-installed flag indicating whether data in the disk-drive-selected application partition has been installed in the user partition for execution by the host computer, or based on a count of the occurrence of predetermined disk-drive events. The data stored in the drive management partition may include disk-drive configuration and physical format data and the data stored in the user partition may include an operating system and user applications. The second disk-drive command protocol may include a command for opening access to the disk-drive-selected application partition and a command for closing access to the disk-drive-selected application partition. The host commands for opening and closing access may include an access code particular to a manufacturer of the disk drive. The industry standard interface protocol may include a command to vary the size of the user partition available to the host computer's normal file system.

BRIEF DESCRIPTION OF THE DRAWINGS

The accompanying drawings illustrate embodiments of the present invention and, together with the description, serve to explain the principles of the invention.

FIG. 2 is table of commands for locating and controlling access to the disk-drive-selected application partition of FIG. 1.

DETAILED DESCRIPTION

Figure 1:
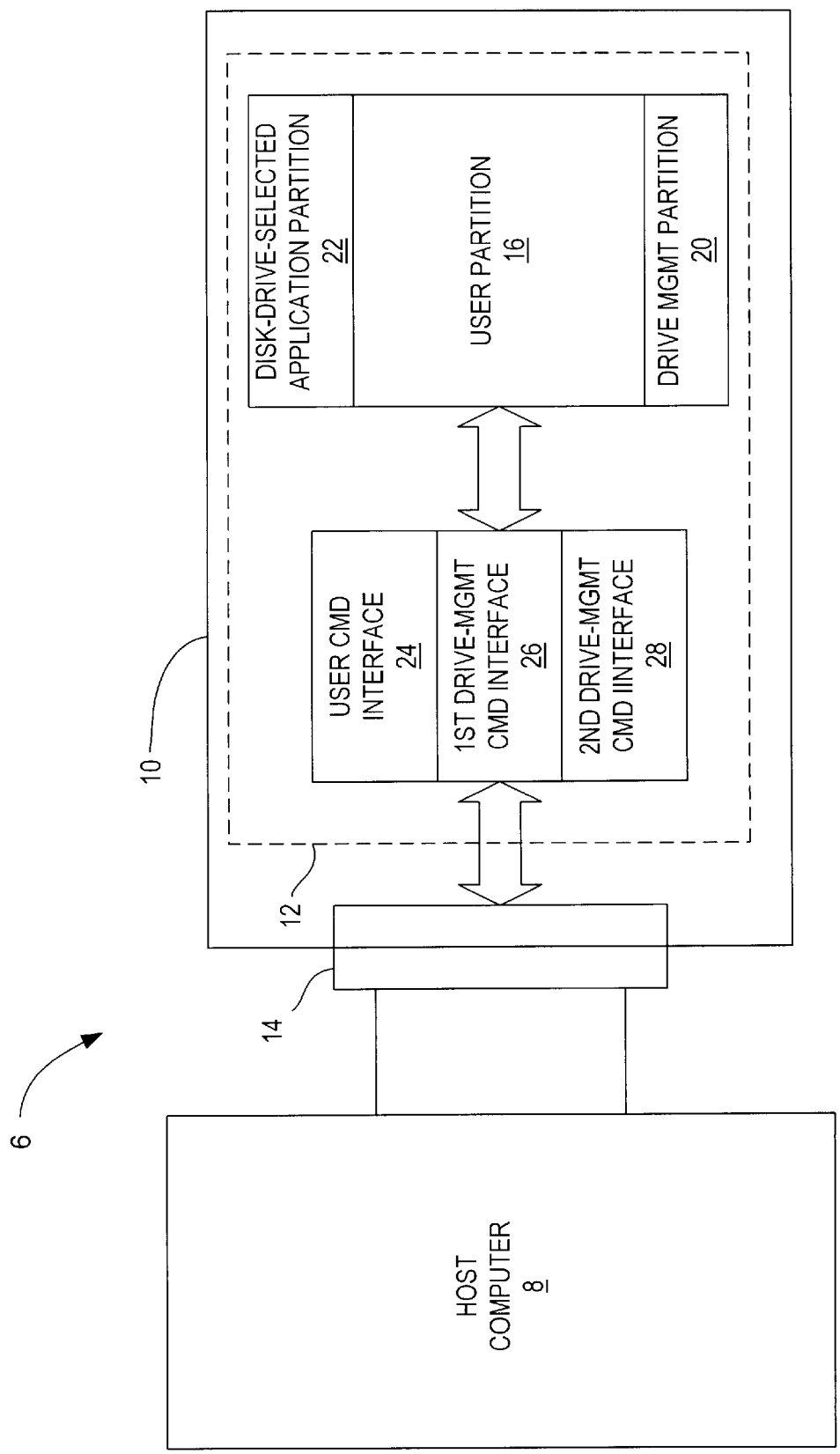
FIG. 1 is a block diagram of a computer system having a host computer coupled to a disk drive having a disk-drive-selected application partition for storing data for execution by the host computer in response to drive-determined conditions, according to the present invention.

With reference to FIG. 1, the present invention may be embodied in a computer system 6 having a host computer 8 coupled to a disk drive 10 having a host interface subsystem 12 for processing host commands received from the host computer through a host interface 14. The host interface subsystem includes a user partition 16, a drive management partition 20, and a disk-drive-selected application partition 22. The user partition stores data for execution by the host computer and the drive management partition stores data for execution by the disk drive. The disk-drive-selected application partition stores data for execution by the host computer in response to a drive-determined condition. The host interface subsystem further includes a user command interface 24, and first and second drive management command interfaces, 26 and 28. The user command interface processes first host commands directed to storing data in the user partition according to an industry standard interface protocol. The first drive management command interface 26 processes second host commands directed to storing data in the disk drive management partition according to a first disk-drive command protocol. The second drive management command interface 28 processes third host commands enabling data storage in the disk-drive-selected application partition according to a second disk-drive command protocol.

The disk media of the disk drive 10 may be divided into surfaces, cylinders and data storage sectors. Each sector generally stores about 512 data bytes. The sectors may be addressed using a logical block address (LBA) that provides a linear addressing scheme for all of the sectors. Typically, the data stored on the user partition includes an operating system and user applications and information. The user partition 16 may be assigned to LBA numbers 0 through a maximum (MAX) LBA. The host computer 8 may access the data storage sectors in the user partition using an industry standard interface protocol. A common standard is the AT Attachment (ATA) Interface between host computers and storage devices. The ATA standard defines the physical interconnection between the host computer and a storage device, operational registers within the storage device, and the commands and protocols for operation of the storage device.

The ATA standard also defines a host protected area for data storage outside the normal file system of the host computer's operating system. The operating system cannot change data in the host protected area. The ATA standard includes a READ NATIVE MAX ADDRESS command and a SET MAX ADDRESS command. These commands are intended for use only by the host computer's system BIOS or other low-level boot time process when the storage device is initially configured.

The drive management partition 20 may be assigned to negative LBA numbers and the corresponding data storage sectors may be accessed using "native" commands. The data in the drive management partition generally includes disk-drive configuration and physical format information written by the disk-drive manufacturer during initial testing and configuration of the disk drive. The native commands generally vary from manufacturer to manufacturer.

The disk-drive selected application partition (DDSAP) 22 is assigned to data storage sectors above the MAX LBA number. The DDSAP is generally configured by the manufacturer before shipment of the disk drive 10. The DDSAP sectors are visible to the disk drive's microprocessor-based internal controller but normally are not visible to the host computer 8. Accordingly, data stored in the DDSAP may not be destroyed by logical partitioning and formatting processes performed on the user partition 16. The DDSAP may store an application program that may be installed in the user partition, based on one or more disk-drive determined conditions, for execution by the host computer.

For example, the host computer 8, when initially turned on, boots up by requesting a master boot record from LBA 0 of the user partition 16. However, the disk drive 10 may determine that an application program in the DDSAP 22 is not installed in the user partition. Accordingly, the disk drive may respond to the LBA 0 request by directing the host computer to install the application from the DDSAP to the user partition. After installation, the disk drive may direct the host computer to reboot and the disk drive then responds to the next LBA 0 request with the MBR resulting in a normal boot process.

As other examples of disk-drive determined conditions, the disk drive 10 may count events, such as power cycling, LBA 0 requests, or reception of specific commands, until a predetermined number (e.g., 50) is reached before providing data stored in the disk-drive-selected partition 22 to the host computer 8 for execution. Further, the disk drive may determine whether the disk drive is configured as a master rather than a slave, or whether the host computer's operating system supports execution of an application on the disk-drive-selected partition.

The DDSAP 22 is accessed by using the commands shown in FIG. 2. The commands are implemented by placing the predetermined command values in the registers of the disk drive 10. A vendor unique command value (8 Ah) may be placed in the command register and a value of 00h may be placed in the cylinder high register. The desired DDSAP command may be placed in the cylinder low register. A manufacturer access code may be place in the sector number, sector count and features registers. The DDSAP commands may include a RETURN DDSAP START LBA command (03 h), a RETURN DDSAP SIZE command (04 h), an OPEN DDSAP command (07 h), and a CLOSE DDSAP command (08 h). The RETURN DDSAP START LBA command returns the number of the starting LBA of the DDSAP. The RETURN DDSAP SIZE command returns a count of the number of LBAs in the DDSAP. After receiving an OPEN DDSAP command, the disk drive allows write and read commands issued by the host computer 8 to access the DDSAP sectors. The write and read commands may be standard ATA write and read commands. After receiving a CLOSE DDSAP command, the disk drive forbids access to the DDSAP sectors and returns an error or abort in response to host commands directed to the DDSAP sectors. The DDSAP commands may also include a SET APPLICATION INSTALLED FLAG command (09 h) for indicating whether the disk-drive-selected application has been installed from the DDSAP to the user partition 16 for execution by the host computer.

The command interfaces 24, 26 and 28, are implemented by firmware executed by a microprocessor-based controller in the disk drive 10. A disk drive having a microprocessor-based controller and that may substitute an LBA request with alternative data is described in U.S. patent application Ser. No. 09/507,121 filed Feb. 17, 2000, which application is incorporated herein by reference.

Figure 3:
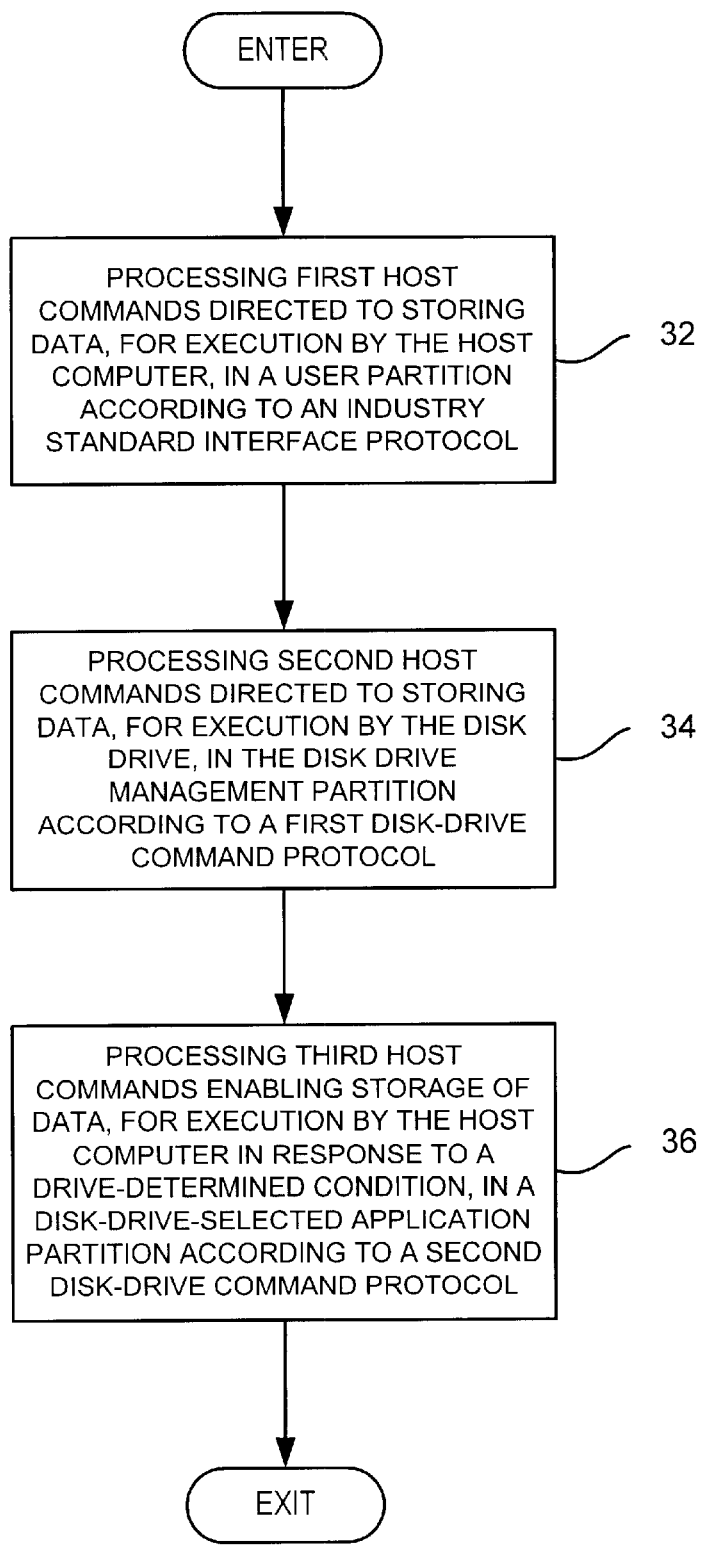
FIG. 3 is a flow diagram illustrating a method for enabling storage of data in a disk-drive-selected application partition, for execution by the host computer in response to drive-determined conditions, according to the present invention.

Alternatively, the present invention may be embodied in a method for processing host commands received by a disk drive 10 connected to a host computer 8 as shown in FIG. 3. The method includes processing first host commands directed to storing data, for execution by the host computer in a user partition 16 according to an industry standard interface protocol (step 32). The method then includes processing second host commands directed to storing data, for execution by the disk drive, in the disk drive management partition 20 according to a first disk-drive command protocol (step 34). The method further includes processing third host commands enabling storage of data, for execution by the host computer in response to drive-determined conditions, in a disk-drive-selected application partition 22 according to a second disk-drive command protocol (step 36).

We claim:

1. A computer system comprising:
 a host computer; and
 a disk drive coupled to the host computer and having a host interface subsystem for processing host commands received from the host computer, the host interface subsystem, including:

a user partition for storing data for execution by the host computer, a drive management partition for storing data for execution by the disk drive, a disk-drive-selected application partition for storing data for execution by the host computer in response to a drive-determined condition, a user command interface for processing first host commands directed to storing data in the user partition according to an industry standard interface protocol, a first drive management command interface for processing second host commands directed to storing data in the disk drive management partition according to a first disk-drive command protocol, a second drive management command interface for processing third host commands enabling data storage in the disk-drive-selected application partition according to a second disk-drive command protocol.

2. A computer system as defined in claim 1, wherein the drive-determined condition is based on an application-installed flag indicating whether data in the disk-drive-selected application partition has been installed in the user partition for execution by the host computer.

3. A computer system as defined in claim 1, wherein the drive-determined condition is based on a count of the occurrence of predetermined disk-drive events.

4. A computer system as defined in claim 1, wherein the data stored in the drive management partition includes disk drive configuration and physical format data.

5. A computer system as defined in claim 1, wherein the data stored in the user partition includes an operating system and user applications.

6. A computer system as defined in claim 1, wherein the second disk-drive command protocol includes a command for opening access to the disk-drive-selected application partition and a command for closing access to the disk-drive-selected application partition.

7. A computer system as defined in claim 6, wherein the commands for opening and closing access includes an access code particular to a manufacturer of the disk drive.

8. A computer system as defined in claim 1, wherein the industry standard interface protocol includes a command to vary size of the user partition available to a normal file system of the host computer.

9. A method for processing host commands received by a disk drive coupled to a host computer, comprising:

processing first host commands directed to storing data, for execution by the host computer, in a user partition according to an industry standard interface protocol;

processing second host commands directed to storing data, for execution by the disk drive, in a disk drive management partition according to a first disk-drive command protocol; and processing third host commands enabling storage of data, for execution by the host computer in response to a drive-determined condition, in a disk-drive-selected application partition according to a second disk-drive command protocol.

10. A method for processing host commands as defined in claim 9, wherein the drive-determined condition is based on an application-installed flag indicating whether data in the disk-drive-selected application partition has been installed in the user partition for execution by the host computer.

11. A method for processing host commands as defined in claim 9, wherein the drive-determined condition is based on a count of the occurrence of predetermined disk-drive events.

12. A method for processing host commands as defined in claim 9, wherein the data stored in the drive management partition includes disk drive configuration and physical format data.

13. A method for processing host commands as defined in claim 9, wherein the data stored in the user partition includes an operating system and user applications.

14. A method for processing host commands as defined in claim 9, wherein the second disk-drive command protocol includes a command for opening access to the disk-drive-selected application partition and a command for closing access to the disk-drive-selected application partition.

15. A method for processing host commands as defined in claim 14, wherein the commands for opening and closing access includes an access code particular to a manufacturer of the disk drive.

16. A method for processing host commands as defined in claim 9, wherein the industry standard interface protocol includes a command to vary size of the user partition available to a normal file system of the host computer.

\* \* \* \* \*